United States Patent
Holmes et al.

(10) Patent No.: US 11,938,406 B2
(45) Date of Patent: Mar. 26, 2024

(54) DYNAMIC ALLOCATION OF COMPUTE RESOURCES FOR HIGHLIGHT GENERATION IN CLOUD GAMING SYSTEMS

(71) Applicant: NVIDIA Corporation, San Jose, CA (US)

(72) Inventors: Stephen Holmes, Fort Collins, CO (US); Pierre Gervais, Blainville (CA)

(73) Assignee: NVIDIA Corporation, Santa Clara, CA (US)

( * ) Notice: Subject to any disclaimer, the term of this patent is extended or adjusted under 35 U.S.C. 154(b) by 341 days.

(21) Appl. No.: 16/435,156

(22) Filed: Jun. 7, 2019

(65) Prior Publication Data
US 2020/0384369 A1 Dec. 10, 2020

(51) Int. Cl.
A63F 13/86 (2014.01)
A63F 13/355 (2014.01)
A63F 13/537 (2014.01)

(52) U.S. Cl.
CPC ............ *A63F 13/86* (2014.09); *A63F 13/355* (2014.09); *A63F 13/537* (2014.09)

(58) Field of Classification Search
CPC ....... A63F 13/86; A63F 13/355; A63F 13/537
USPC .......................................................... 463/31
See application file for complete search history.

(56) References Cited

U.S. PATENT DOCUMENTS

| | | | |
|---|---|---|---|
| 8,495,678 B2* | 7/2013 | Perlman | H04L 65/80 725/116 |
| 9,032,465 B2* | 5/2015 | Perlman | H04N 21/2402 725/136 |
| 9,061,207 B2* | 6/2015 | Perlman | H04L 65/403 |
| 10,661,169 B1* | 5/2020 | Saucedo | A63F 13/35 |
| 2012/0184373 A1* | 7/2012 | Kim | H04L 65/612 463/42 |
| 2013/0210526 A1* | 8/2013 | Kim | H04L 47/70 463/42 |
| 2013/0235209 A1* | 9/2013 | Lee | H04N 21/23103 348/E7.086 |
| 2016/0026253 A1* | 1/2016 | Bradski | H04N 13/128 345/8 |
| 2016/0142243 A1* | 5/2016 | Karam | H04L 41/022 709/202 |
| 2016/0199742 A1* | 7/2016 | McCarthy | H04N 21/8549 463/31 |
| 2016/0361646 A1* | 12/2016 | Perry | G06F 3/048 |
| 2017/0050110 A1* | 2/2017 | Perry | A63F 13/355 |
| 2017/0157512 A1* | 6/2017 | Long | A63F 13/497 |

(Continued)

*Primary Examiner* — Chase E Leichliter
(74) *Attorney, Agent, or Firm* — Taylor English Duma L.L.P.

(57) ABSTRACT

In various examples, compute resources may be allocated for highlight generation in cloud gaming systems. Systems and methods are disclosed that distribute, between and among various devices, processing including user interface generation and overlay, analysis of game streams for actionable events, generation of highlights, storage of highlights, and sharing of highlights. The distribution of processing or compute resources within the cloud gaming system may be dependent on system information of various devices and/or networks. Recordings, snapshots, and/or other highlights may be generated within the cloud gaming system using the determined distribution of compute resources.

20 Claims, 7 Drawing Sheets

(56) References Cited

U.S. PATENT DOCUMENTS

| | | | | |
|---|---|---|---|---|
| 2017/0354888 A1* | 12/2017 | Benedetto | ............... | A63F 13/47 |
| 2018/0021684 A1* | 1/2018 | Benedetto | ............... | A63F 13/63 |
| | | | | 463/24 |
| 2019/0321725 A1* | 10/2019 | Zimring | .................. | A63F 13/40 |
| 2020/0023275 A1* | 1/2020 | Pavlov | .................. | A63F 13/355 |
| 2020/0238175 A1* | 7/2020 | Smullen | ................. | A63F 13/53 |
| 2020/0384369 A1* | 12/2020 | Holmes | ................ | A63F 13/355 |

\* cited by examiner

DYNAMIC ALLOCATION OF COMPUTE RESOURCES FOR HIGHLIGHT GENERATION IN CLOUD GAMING SYSTEMS

BACKGROUND

During a game session, a user may desire to have a screenshot, a highlight, or a clip recorded for at least a portion of the game session—e.g., so that the user may share the recorded material, review the material at a later time, or otherwise have access to the recording. Conventional systems and methods have allowed players to record game sessions, or portions thereof, locally on their client device. However, just to be able to render frames of the game session locally (e.g., on a client device), the client device must include a substantial amount of computing resources. Performing functions such as generating recorded material locally may require additional hardware and network computing resources beyond rendering the frames of the game session locally.

In other conventional systems and methods, players may be able to stream game sessions from their client device once a recording of the gameplay is generated (e.g., stream viewing). In stream viewing, each (or some number of) frames of a game may be copied from a display of the client device and then uploaded to a (typically) separate service or application for distribution to a stream viewing audience (e.g., on social media). If a user is stream viewing their game streaming session, each frame must be copied at the client device and sent to the third party for distribution—thereby requiring significant bandwidth and processing power. As such, similar to described above, these capabilities may be unavailable to client devices without sufficient storage capacity, GPU capability, or other hardware functionality to perform highlight generation, storage, and/or sharing effectively. As a result, client devices with limited hardware or bandwidth capabilities may be unable to generate and/or share snapshots, highlights, or recordings of gameplay—thereby affecting the user experience.

SUMMARY

The present disclosure relates to the allocation of compute resources for highlight generation in cloud gaming systems. Systems and methods are disclosed that distribute, between and among various devices, processing including user interface generation and overlay, analysis of game streams for actionable events, generation of highlights, storage of highlights, and sharing of highlights. As used herein, a highlight may include any capture of a stream of a game session, including a snapshot or screenshot of gameplay, a recording of an entire game session, or a recording of a portion (e.g., a clip) of a game session—such as a recording of a specific action or event within a gameplay session.

In contrast to the conventional systems, such as those described above, the system and methods of the present disclosure analyze hardware, software, and/or network functionality of client devices to determine how to allocate processing tasks within the system (e.g., among client device(s), a streaming server(s), a secondary system(s), etc.). For example, a proxy agent—responsible for various tasks within the highlight generation system—may be variably shifted between a client device, a streaming device, and/or a secondary system (e.g., a remote system offloaded with processing tasks). The proxy agent may record the game stream (e.g., within a memory device, such as a buffer), generate and render user interface elements related to highlight generation, analyze the game stream for actionable events (e.g., events or actions within the game that trigger highlight generation), respond to commands for generating highlights (e.g., from the client device, the streaming device, the secondary system, or a combination thereof), and signal the generation and storage of highlights.

As such, because the proxy agent may be responsible for a variety of tasks within the system, various processes of the proxy agent may be shifted between the various devices of the system. In some examples, the streaming device (or another device of the system) may query the client device to determine hardware, software, and/or bandwidth capabilities (referred to herein as system information). In response to determining the system information, the various tasks of the proxy agent may be shifted—dynamically, in some embodiments—among the devices of the system to enhance the cloud gaming experience for the end user. As a non-limiting example, by executing some processing tasks on the client device (e.g., generation of highlights and storage of the highlights) and some processing tasks on the streaming device and/or secondary device (e.g., analysis of the game stream for actionable events), each of the devices in the system may benefit from improved bandwidth usage, increased processing speeds, lower-latency, and higher game stream resolution.

BRIEF DESCRIPTION OF THE DRAWINGS

The present systems and methods for the allocation of compute resources for highlight generation in cloud gaming systems is described in detail below with reference to the attached drawing figures, wherein.

DETAILED DESCRIPTION

Figure 1A:
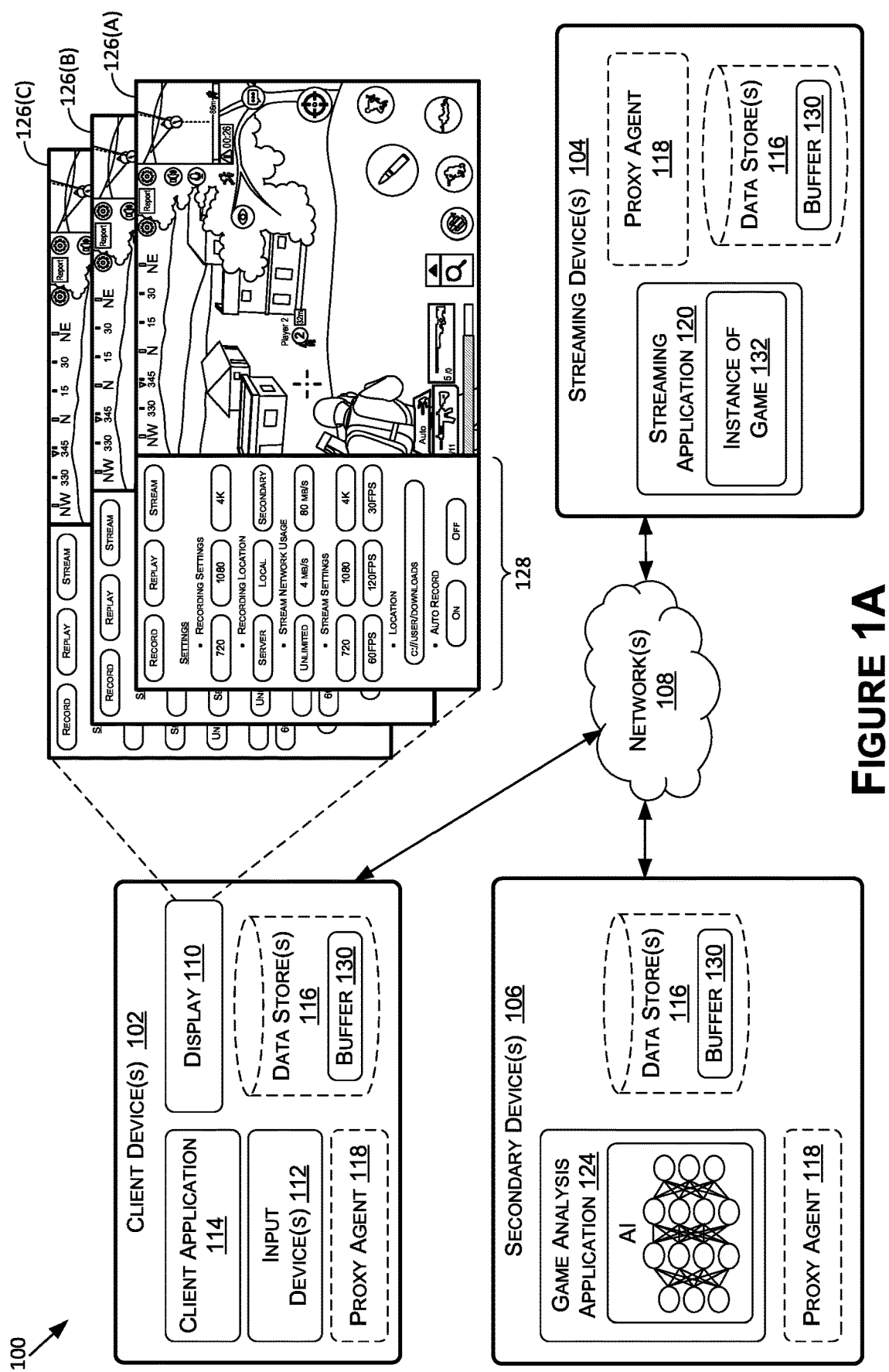
FIG. 1A is an example system diagram for highlight generation in cloud gaming systems, in accordance with some embodiments of the present disclosure.

Systems and methods are disclosed related to allocation of compute resources for highlight generation in cloud gaming systems. As described herein, and in contrast to conventional systems, the present disclosure provides for shifting of one or more tasks of a highlight generation system between and among various devices in an effort to efficiently distribute compute resources, network usage, and storage requirements within the system. As a result, a streaming device(s) (e.g., a server responsible for rendering, encoding, and streaming game sessions of one or more users), a client device(s) (e.g., a tablet, computer, smartphone, streaming device, game console, or other device that displays the stream of the game and receives and transmits inputs), and/or a secondary device(s) (e.g., a server responsible for one or more overflow tasks) may be responsible for executing tasks within the system in a way that allows for a high-quality, low-latency game stream for each of the users of the system.

In some examples, the tasks associated with generating a highlight within a cloud gaming environment may be referred to as tasks of a proxy agent. As such, the proxy agent may be distributed between and among the various devices of the highlight generation system. In some examples, the proxy agent may dynamically shift tasks between the various devices dependent on system information of each of the client device(s). The system information may include storage capacity, encoding capability, processing capability, the recording settings of the game stream, network information, and/or other system information. The system information may be with respect to the streaming device(s), client device(s), and/or secondary device(s). Thus, in further contrast to conventional systems where the client device(s) is tasked with rendering the game, generating the highlights, storing the highlights, sharing the highlights, and executing each task of highlight generation, the highlight generation system of the present disclosure takes into account the limitations of client device(s). For example, a first client device(s) may have greater storage and/or processing capabilities than a second client device(s), so the tasks of the proxy agent distributed among the various devices may be different (e.g., customized) for the first client device(s) than a customization used for the second client device(s). As a non-limiting example, instead of generating user interface elements (e.g., an overlay) for controlling generation of a highlight or recording (e.g., based on recording settings) being performed by the streaming device(s), the user interface elements may be generated on the client device(s). By generating the user interface elements at the client device(s) within a client application, less bandwidth and compute resources may be required by the streaming device, and the image quality of the user interface elements in the overlay may be increased. As another non-limiting example, where the client device(s) has enough storage capacity and/or processing capabilities, the generation and storage of highlights of the game stream may be executed by the client device(s)—thus offloading the storage and processing requirements from the streaming device(s) to the client device(s) to allow the streaming device(s) to maintain a high image quality, low-latency game stream. Thus, as compared to conventional systems where a single device is responsible for highlight generation, by shifting the tasks of the proxy agent—dynamically, in some embodiments—between and among the streaming device(s), the client device(s), and/or the secondary device(s), the storage, processing, compute, and bandwidth burdens of the systems may be distributed in an effort to reduce the individual burden on any one device.

As described above, conventional systems do not operate in game streaming environments. Even where a recording of a game is streamed (e.g., in stream-viewing), the original game rendering is executed on the client device(s) and the recording is executed on the client device(s). As such, in the game streaming environment, additional constraints are realized as a result of the streaming device(s) being responsible for receiving inputs from the client device(s), rendering the game in view of the inputs, encoding the game stream, and transmitting the game stream to the client device(s). For example, game streaming often experiences a bandwidth issue when streaming high quality gaming content with low-latency over the Internet, while also allowing bandwidth for inputs to be sent back from the client device(s) to the streaming device(s).

On top of these constraints of the game streaming system alone, introducing a highlight generation system within the game streaming environment introduces even more constraints. For example, if a recorded highlight is generated and stored at the streaming device(s), the file size of the highlight may become cost prohibitive, and/or may require the use of additional bandwidth to transmit or stream the highlight back to the client device(s) for viewing (e.g., during or after gameplay). In addition, as the streaming device(s) become responsible for managing and streaming game sessions to multiple end users, in addition to generating and storing highlights for one or more of the end users, the processing capacities of the streaming device(s) may be impacted (reduced). A reduction in the processing capacities of the streaming device(s) may result in one or more end users experiencing lower quality game streams, higher latency, and/or other stream quality issues during gameplay. As such, by shifting one or more tasks of the proxy agent of the highlight generation system between and among various devices within the game streaming environment, the constraints of the system may be accounted for in a way that allows end users to experience high image quality, low-latency game streams with associated seamless highlight generation functionality.

Now referring to FIG. 1A, FIG. 1A is an example system diagram of a highlight generation system 100 for a cloud gaming environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The highlight generation system 100 may include, among other things, one or more client device(s) 102, one or more streaming device(s) 104, one or more secondary device(s) 106, and/or one or more network(s) 108. The highlight generation system 100 (and the components and/or features thereof) may be implemented using one or more computing device(s), such as the computing device 500 of FIG. 5, described in more detail herein.

Each of the devices or components of the highlight generation system 100 may communicate between and among one another using the network(s) 108. The network(s) 108 may include a wide area network (WAN) (e.g., the Internet, a public switched telephone network (PSTN), etc.), a local area network (LAN) (e.g., Wi-Fi, Ethernet, etc.), and/or another network type.

The client device(s) 102 may include a smart phone, a laptop computer, a tablet computer, a desktop computer, a wearable device, a game console, a virtual reality system (e.g., a headset, a computer, a game console, remote(s), controller(s), and/or other components), a streaming device (e.g., an NVIDIA SHIELD), a smart-home device that may include an intelligent personal assistant, and/or another type of device capable of supporting at least display of a game stream of a game sessions 126 and/or inputs to the game sessions 126 from an input device(s) 112.

Figure 1B:
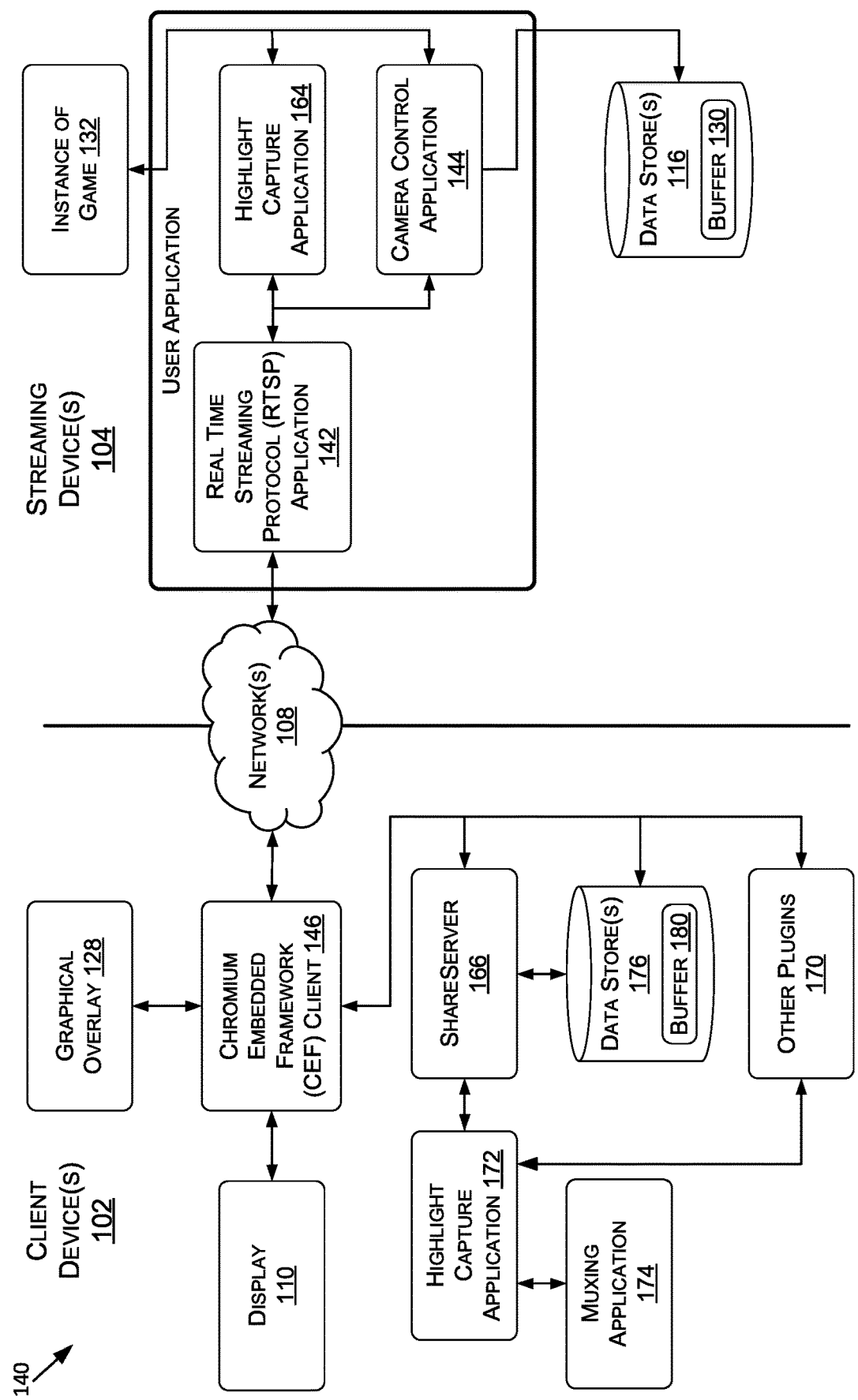
FIG. 1B is an example system diagram for highlight generation in cloud gaming systems including a client device and a streaming device, in accordance with some embodiments of the present disclosure.
Figure 1C:
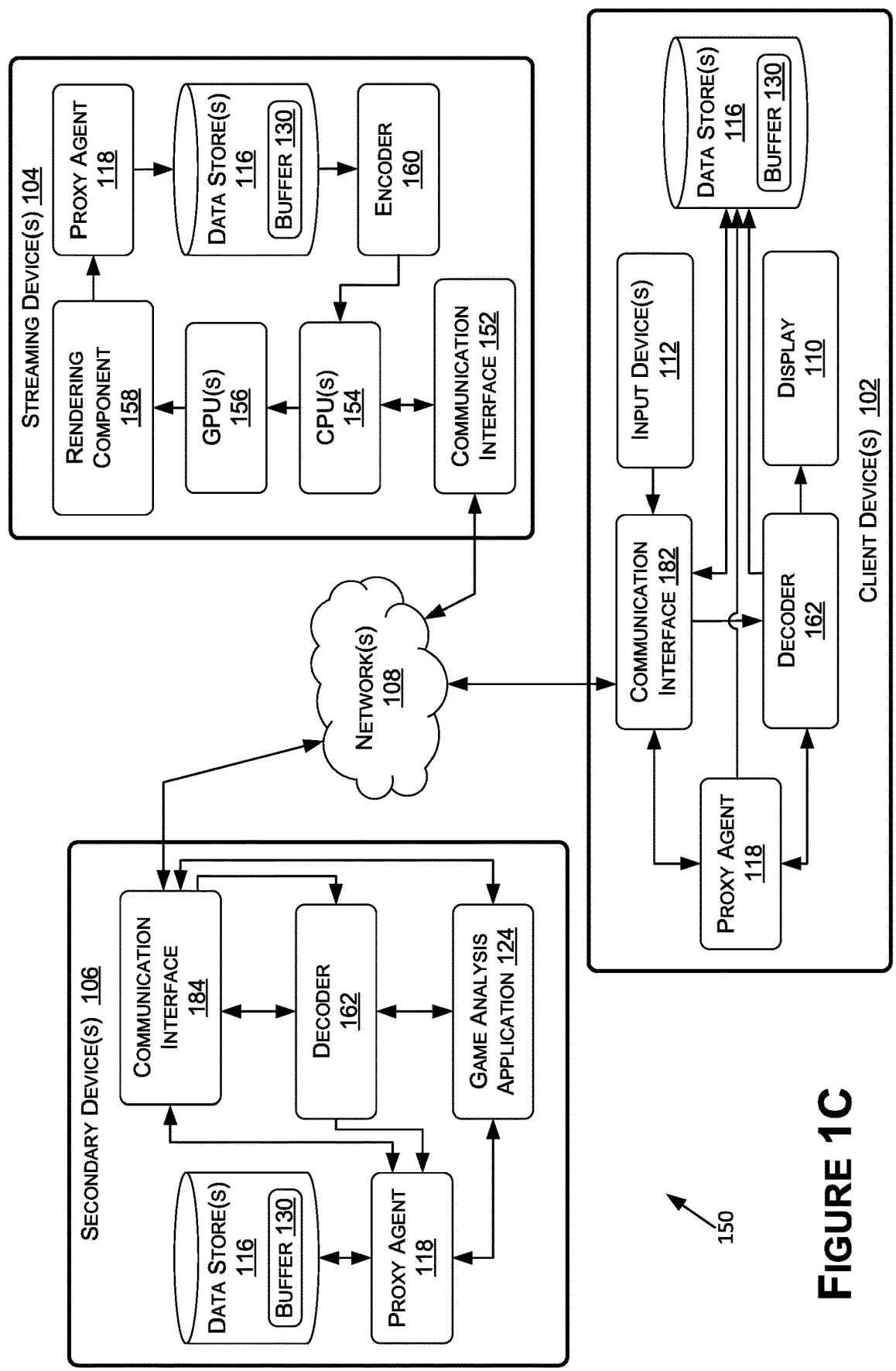
FIG. 1C is another example system diagram for highlight generation in cloud gaming systems, in accordance with some embodiments of the present disclosure.

The client device(s) 102 may include a display 110, one or more input device(s) 112, a client application 114, one or more data store(s) 116, and/or at least some of the functionality of a proxy agent 118. In some examples, at least some of the functionality of the proxy agent 118 may be executed within the client application 114. Although certain components and/or features of the client device(s) 102 are illustrated in FIG. 1, this is not intended to be limiting. For example, the client device(s) 102 may have additional or alternative components, such as, without limitation, those described herein with respect to the computing device 500 of FIG. 5. The features and functionality of the client device(s) 102 may be described in more detail herein with respect to FIG. 1B and FIG. 1C.

The client application 114 may be a mobile application, a computer application, a console application, a game application, and/or another type of application. The client application 114 may include instructions that, when executed by a processor(s) of the client device(s) 102, cause the processor(s) to perform one or more operations (such as but not limited to the operations described herein with respect to the highlight generation system 100). The client application 114 may operate as a facilitator for enabling gameplay of an instance of a game. For example, the client application 114 may, without limitation, display a game stream received from the streaming device(s) 104, receive and/or process inputs from one or more of the input device(s) 112 of the client device(s) 102, and/or cause transmission of input data representative of the inputs to the streaming device(s) 104. In some examples, as described herein, the client application 114 may include some of the features or functionality of the proxy agent 118, such as highlight generating and displaying a graphical overlay 128 (FIG. 2) for generating highlights, recordings, or snapshots, for programming recording settings, etc. In addition, in some examples, the client application 114 may cause generation of the highlights, storage of the highlights, analysis of the game stream for determining when highlights should be generated, sharing of the highlights, etc. In some embodiments, the client device(s) 102 may include any number of client application 114 where features and functionality of the highlight generation system 100 are distributed.

The client device(s) 102 may include one or more components (e.g., a communication component, network interface, etc.) and features for communicating across one or more networks, such as the network(s) 108. As a non-limiting example, to communicate within the highlight generation system 100, the client device(s) 102 may use a wired Ethernet connection and/or Wi-Fi connection through a router to access the Internet in order to communicate with the streaming device(s) 104, the secondary device(s) 106, and/or with other client device(s) 102.

The display 110 may include any type of display capable of displaying the game (e.g., a light-emitting diode display (LED), an organic LED display (OLED), a liquid crystal display (LCD), an active matrix OLED display (AMOLED), a quantum dot display (QDD), a plasma display, and/or another type of display). In some examples, depending on the configuration of the client device(s) 102, the display 110 may include more than one display (e.g., a dual-monitor display for computer gaming, a first display for configuring a game and a virtual reality display for playing the game, etc.). Where the display 110 is a touch-screen display, such as a touch-screen of a smart phone, tablet computer, laptop computer, and/or the like, the display 110 may be used as at least one of the input device(s) 112 of the client device(s) 102 (e.g., one of the input device(s) 112 for generating inputs to an instance of the game 132 for transmission to the streaming device(s) 104 for updating the rendering of the game). The display 110 may display the game stream of one or more game sessions, such as a game sessions 126(A), game sessions 126(B), and/or game sessions 126(C) (referred to collectively herein as "game sessions 126"). The game sessions 126 may include any number of game sessions participated in by the user of the client device(s) 102.

The input device(s) 112 may include any type of devices that are capable of providing user inputs to the game. The input device(s) may include a keyboard, a mouse, a joystick, a touch-screen display, a controller(s), a remote(s), a headset (e.g., sensors of a virtual reality headset), another type of input device, and/or a combination thereof.

The data store(s) 116 may include any memory device types. The data store(s) 116 may store some or all of the game stream in embodiments where the client device(s) 102 may be tasked with storage and/or generation of highlights. For example, the data store(s) 116 may store the entire game stream, and snapshots, highlights, and/or recordings may be generated from the stored game stream. The snapshots, highlights, and/or recordings may be separately stored in the data store(s) 116 once generated, or indications (e.g., timestamps) for the snapshots, highlights, and/or recordings may be stored (e.g., as metadata) such that the snapshots, highlights, and/or recordings can be copied or retrieved from the stored game stream using the indication.

In some examples, the data store(s) 116 may only store a portion of the game stream. For example, the data store(s) 116 may only store the snapshots, highlights, and/or recordings. A buffer 130 may be used to store a portion of the game stream, and the highlights, snapshots, or recordings may be copied or retrieved from the buffer (and separately stored in the data store(s) 116). The buffer 130 may store only a portion of game stream (e.g., the most recent thirty seconds of the game stream may be stored in the buffer 130). As such, when a snapshot, highlight, or recording may be generated, at least some of the portion of the game stream in the buffer 130, in addition to, in some examples, a next portion of the game stream (e.g., the next ten seconds) may be copied or retrieved in order to generate the snapshot, highlight, and/or recording. The buffer 130 may include a cyclic or rolling buffer, in some non-limiting examples.

The streaming device(s) 104 may include a streaming application 120 for receiving input data representative of inputs to the client device(s) 102, rendering an instance of a game 132, encoding the instance of the game 132 in a stream, and transmitting the stream to the client device(s) 102. In some examples, as described herein, the streaming application 120 may include some of the features or functionality of the proxy agent 118, such as highlight generation and encoding of the graphical overlay 128 (FIG. 2) within the game stream (e.g., where the client device(s) 102 have limited processing). In addition, in some examples, the streaming application 120 may cause generation of the highlights, storage of the highlights, analysis of the game stream for determining when highlights should be generated, sharing of the highlights, etc. In some embodiments, the streaming device(s) 104 may include any number of streaming application 120 where features and functionality of the highlight generation system 100 are distributed. The features and functionality of the streaming device(s) 104 may be described in more detail herein with respect to FIG. 1B and FIG. 1C.

In some embodiments, the streaming device(s) 104 may render an instance of the game 132, and communicate the game stream to two or more device(s) as a plurality of instances of the game. In these embodiments, the two or more instances of the game may be copies of the rendered instance of the game. In these embodiments, sending two instances of the game via network(s) 108 may be advantageous to simultaneously display the instance of the game at a client device(s) 102 and/or capture at least a portion of the game stream at a secondary device(s) 106.

The streaming device(s) 104 may include one or more components (e.g., a communication component, network interface, etc.) and features for communicating across one or more networks, such as the network(s) 108. As a non-limiting example, to communicate within the highlight generation system 100, the streaming device(s) 104 may transmit and receive data across the Internet in order to communicate with the secondary device(s) 106, the client device(s) 102, and/or other streaming device(s) 104.

The streaming device(s) 104 may include the data store(s) 116, similar to the data store(s) 116 of the client device(s) 102 and/or the secondary device(s) 106, described herein. For example, depending on the distribution of the tasks of the proxy agent 118, the streaming device(s) 104 may be tasked with generating, storing, and/or sharing the highlights, snapshots, and/or recordings of the game stream.

The secondary device(s) 106 may include a game analysis application 124 for receiving a game stream from the streaming device(s) 104 and/or the client device(s) 102 (e.g., via the streaming device(s) 104) and analyzing the game stream for events and/or actions within the instance of the game 132. The events and/or actions may be recordable events that, upon detection, cause a highlight, snapshot, and/or recording to be generated by the secondary device(s) 106, the client device(s) 102, and/or the streaming device(s) 104. Analysis of the game stream, although illustrated in a non-limiting example as being executed by the game analysis application 124, may be included as a task of the proxy agent 118. As such, in some examples, the game analysis application 124 of the secondary device(s) 106 may include some of the features or functionality of the proxy agent 118, such as game stream analysis, determining when highlights are to be generated, and/or causing generation of highlights (e.g., by generating and transmitting signals to the client device(s) 102 and/or the streaming device(s) 104 indicating that a highlight should be generated). The features and functionality of the secondary device(s) 106 may be described in more detail herein with respect to FIG. 1B and FIG. 1C.

The secondary device(s) 106 in some embodiments may be third party services or devices for recording and/or live streaming the game stream. In some embodiments, the secondary device(s) 106 may be stream viewing devices configured to receive and transmit at least a portion of the game stream to a plurality of viewing devices. For example, in some embodiments, the secondary device(s) may receive the game stream from the streaming device(s) 104 and redistribute the game stream to a plurality of viewers (e.g., "live streaming"). In some embodiments, similar to other embodiments disclosed herein, streaming to a secondary device(s) 106 such as third party services or devices may reduce processing resources and network resources for a client device(s) 102 as compared to conventional game streaming systems.

The game analysis application 124 may analyze the game stream to determine a recording event has occurred, and signal to the proxy agent 118 to capture (or save from a buffer) at least a portion of the game stream. The game analysis application 124 may determine a recording event occurred based on artificial intelligence, computer vision, text recognition, and/or other programs and methods of analysis. The recording event may be any instance indicated by a game as a significant event. A significant event indicated by the game may include eliminating another character in the game, collecting a certain item, scoring a goal, hitting a home run, summiting a tall building or mountain, performing or achieving a user-specified task or goal, and/or another event type. For example, in some embodiments, the game analysis application 124 may recognize changes in a reticle of the game sessions 126 that indicate an in-game elimination of a character and signal to the proxy agent 118 to capture at least a portion of the game stream. In another example, the game analysis application 124 may recognize text (e.g., using optical character recognition (OCR)) in the game instance 126 signifying "Player 1 eliminated Player 4," or "Player 1 scored a touchdown," and signal to the proxy agent 118 to capture at least a portion of the game stream.

In addition, although the game analysis application 124 is listed as a feature of the secondary device(s) 106, this is not intended to be limiting. For example, in some embodiments, the secondary device(s) 106 may not be included in the highlight generation system 100. As such, the game analysis application 124, and/or features and functionality thereof, may be executed on the client device(s) 102, the streaming device(s) 104, and/or a combination thereof. For example, similar to other features and functionality of the proxy agent 118, the analysis of the game stream may be executed by one or more of the other devices of the highlight generation system 100.

The secondary device(s) 106 may include one or more components (e.g., a communication component, network interface, etc.) and features for communicating across one or more networks, such as the network(s) 108. As a non-limiting example, to communicate within the highlight generation system 100, the secondary device(s) 104 may transmit and receive data across the Internet in order to communicate with the streaming device(s) 104, the client device(s) 102, and/or other secondary device(s) 106.

The secondary device(s) 106 may include the data store(s) 116, similar to the data store(s) 116 of the client device(s) 102 and/or the streaming device(s) 104, described herein. For example, depending on the distribution of the tasks of the proxy agent 118, the secondary device(s) 106 may be tasked with generating, storing, and/or sharing the highlights, snapshots, and/or recordings of the game stream.

The proxy agent 118 may include various functions for generating highlights within the system 100. As described herein, the proxy agent 118 may be used to overcome many of the limitations of other systems by shifting or allocating resources used by the client device(s) 102, secondary device(s) 106, and/or streaming device(s) 104 within the highlight generation system 100 in order to effectively and efficiently perform the various functions of highlight generation. Although the proxy agent 118 is listed as a feature of each of the client device(s) 102, the secondary device(s) 106, and the streaming device(s) 104 in FIG. 1A, this is not intended to be limiting. For example, the tasks of the proxy agent 118 may be executed on the client device(s) 102, the secondary device(s) 106, the streaming device(s) 104, and/or a combination thereof. For a non-limiting example, and with respect to the functionality of the proxy agent 118 within the system 100, the client device(s) 102 may capture at least a portion of the game stream as a highlight and the streaming device(s) 104 may analyze the game stream using the game analysis application 124 to provide an indication (e.g., via a message) to the client device(s) 102 to capture the highlight. In another non-limiting example, the generation of the graphical overlay 128 may be at the streaming device(s) 104 and capture of at least a portion of the game stream may be at the client device(s) 102. In yet another non-limiting example, the generation of the graphical overlay 128 may be at the client device(s) 102 and the capture of at least a portion of the game stream may occur at the streaming device(s) 104.

The proxy agent 118 may be configured to capture at least a portion of the instance of the game as a highlight, which in some embodiments may be a screenshot, a short recording of a game stream, and/or an substantial (even entire) recording of gameplay. A determination of when to capture the instance may be based on an indication to capture at least the portion of the game stream. The indication may be based on analysis of the game stream using computer vision, artificial intelligence (e.g., inputting frames of the game session to a neural network trained to detect events, actions, or other recording events in the game session), OCR, game state analysis, user input (e.g., to a graphical overlay 128), and/or other criteria. The proxy agent 118 may receive the instance of the game and store the portion of the instance of the game on the data store(s) 116. In some examples, the proxy agent 118 may store—e.g., continuously—at least some of the game stream in the buffer 130 of the data store(s) 116. In such an example, the buffer 130 may store a most recent portion of the instance of the game, such that the highlights, snapshots, and/or recordings may be generated from the buffer 130. As a non-limiting example, the most recent duration (e.g., thirty seconds) of gameplay from a given instance of the game may be recorded in the buffer 130, and when an indication is received for generating a highlight, the recording in the buffer 130 may be moved or copied to the data store(s) 116 for permanent storage.

The proxy agent 118 may be configured to generate a graphical overlay 128 for configuring recording settings, triggering highlight generation, setting user-defined recording events for highlight generation, and/or programming other recording functions. For example, the graphical overlay 128, as described with respect to FIG. 2, may include a plurality of functions, such as for controlling aspects of the capture of at least a portion of the game stream. Rendering the graphical overlay 128 may require compute resources and/or hardware that some client devices 102 may not be equipped with. As such, in conventional systems, these client devices 102 may not have been otherwise capable of generating highlights due to their inability to render a graphical overlay 128. The proxy agent 118, however, may overcome these limitations by shifting the rendering of the graphical overlay 128 between the client device(s) 102, the secondary device(s) 106, and/or the streaming device(s) 104. As such, where it is determined there are sufficient resources for the client device(s) 102 to generate the graphical overlay 128, the client device(s) 102 may generate the graphical overlay 128 (e.g., within the client application 114). In other embodiments, such as where it is determined there are insufficient resources for the client device(s) 102 to generate the graphical overlay 128, the streaming device(s) 104 and/or the secondary device(s) 106 may generate the graphical overlay 128 and include the graphical overlay in the game stream. In some embodiments the graphical overlay 128 may include controls for capturing clips of the game stream, filtering generated highlights, searching for generated highlights, runtime status, gallery selection, and/or hotkey management.

The graphical overlay 128 may be generated by an application separate from the application that renders the game (e.g., the game application). For example, where the client device(s) 102 render the graphical overlay 128, a client application of the client device(s) 102 (e.g., a client application performing the functions of the proxy agent 118 at the client device(s) 102) may render and display the graphical overlay 128 on the display 110 separately from the display of the game stream. Although rendered separately, the graphical overlay 128 may be displayed at the same time as the game stream (e.g., on a portion of the display, such as a left-hand side, a top dropdown, a right-hand side, a popup on the display, etc.). As another example, where the streaming device(s) 104 renders the graphical overlay 128, a streaming application of the streaming device(s) 104 (e.g., a streaming application performing the functions of the proxy agent 118 at the streaming device(s) 104) may render the graphical overlay 128 separately from the rending of the game, and may capture both the graphical overlay 128 and the game in the game stream (e.g., with the graphical overlay 128 overlaid on the game within the game stream). Because the graphical overlay 128 may be separately rendered, as part of a different application than the application that uses game state data to render the game, the graphical overlay 128 may be referred to herein as a supplemental graphical overlay. As such, the graphical overlay 128 may be displayed to supplement the game-based displayed information (e.g., the game itself, and the graphical overlays and GUIs of the game). As a result, when a user provides an input to the graphical overlay 128, whether included in the game stream from the streaming device(s) 104 and/or rendered within a client application on the client device(s) 102, the inputs may be sent to the proxy agent 118 rather than provided to the game itself for affecting the game.

The proxy agent 118 may be configured to transmit the game stream to additional devices and/or to a third party service for stream viewing. In some embodiments, the transmission of the game steam for stream viewing may occur simultaneously with, or delayed from, the game stream. The transmission of the game stream for stream viewing may occur separately from the proxy agent 118 recording the game stream. For example, the proxy agent 118 may record the game stream at the client device(s) 102 and transmit the game stream to additional devices and/or to a third party service for stream viewing. In this example, the streaming device(s) 104 may stream the game stream to both the client device(s) 102 and secondary device(s) 106 over the network(s) 108.

As such, the proxy agent 118 and its associated functionality may be distributed between and among various devices within the system 100. However, because the game is being streamed from the streaming device(s) 104, and because the proxy agent 118 may be distributed among different devices within the system 100, implementation of the recording functionality by game developers may seem cost prohibitive. For example, without the use of the proxy agent 118, the game developers may be required to have different functionality depending on the different distribution of compute resources within the system 100. This functionality may require generation of different types of messages and/or application programming interface (API) calls to different devices, components, and/or features depending on the different distributions of compute resources. In order to avoid or reduce this burden on game developers, game developers within the system 100 may only have to program the generation of a same message type and/or same API call type regardless of the distribution of compute resources in the system 100. As such, the proxy agent 118 may be configured to receive the same message type and/or the same API call type from the game application being rendered on the streaming device(s) 104, and may determine and/or facilitate the allocation of tasks within the system 100. For example, a user may provide an input to a hotkey that indicates the request to generate a highlight, and the game application may generate a message and/or an API call that represents the indication of the request. The proxy agent 118 may receive the message and/or the API call, and determine which devices within the system 100 should execute the different tasks of generating the highlight. As a result, to the game developers or the game application, the game generation and rendering may appear to be executing on local hardware of the client device(s) 102, even though the game is being generated and rendered on the streaming device(s) 104. Thus, by using the proxy agent 118, the implementation of the system 100 may be substantially seamless to the game developer—thereby reducing the implementation burden on game developers when integrating highlight recording functionality within a game streaming environment.

In addition, because the game is streamed to the client device(s) 102, and the proxy agent 118 may be used to distribute compute resources based on the system information, the requirement that the client device(s) 102 have any specific hardware and/or software configurations—such as certain operating systems, GPU(s), etc.—is removed. As such, the highlight generation system 100 may be used for any client devices 102 irrespective of their respective hardware and/or software configurations.

Now referring to FIG. 1B, FIG. 1B is another example system diagram of a highlight generation system 140 in cloud gaming systems using a client device(s) 102 and a streaming device(s) 104, in accordance with some embodiments of the present disclosure. The highlight generation system 140 may include, among other things, the client device(s) 102 (which may include similar components, features, and/or functionality to the client device(s) 102 of FIG. 1A) and streaming device(s) 104 (which may include similar components, features, and/or functionality to the streaming device(s) 104 of FIG. 1A) that communicate between each other using the network(s) 108 (which may be similar to the network(s) 108 of FIG. 1A).

In the highlight generation system 140, the streaming device(s) 104 may include the instance of the game 132. The instance of the game 132 is shown in bilateral communication with and among: a camera control application 144, a real time streaming protocol (RTSP) application 142, and highlight capture application 164. The instance of the game 132 may be available to, or transmitted to, the camera control application 144 and/or the highlight capture application 164. As the instance of the game 132 is generated, the camera control application 144, and/or the highlight capture application 164 may perform various functions—such as, but not limited to, those listed herein—using data from the instance of the game 132.

The camera control application 144 may include in-game photography services. For example, the camera control application 144 may capture in-game shots at any of a variety of viewing angles (e.g., 180 degrees, 360 degrees, etc.). The camera control application 144 may enable capture of in-game shots from any position (e.g., even positions from a different perspective than that of a current perspective of the user). The camera control application 144 (e.g., NVIDIA's ANSEL) may capture screenshots and apply one or more post-processing filters (e.g., to adjust color, saturation, add pre-defined filters such as sepia, retro, night mode, and/or to change other characteristics) during gameplay (e.g., using NVIDIA's FREESTYLE). Although illustrated separately from the highlight capture application 164, in FIG. 1B, this is not intended to be limiting. In some examples, at least some of the features and functionality of the camera control application 144 may be executed by the highlight capture application 164.

The highlight capture application 164 may include a highlight capture service on the streaming device(s) 104. The highlight capture application 164 may directly interpret the instance of the game 132 API requests to capture recordings of gameplay. In some embodiments the highlight capture application 164 may be a non-streaming, single system platform which may directly interpret the generated game's API requests to capture highlights on the streaming device(s) 104. In some embodiments the capture of highlights on streaming device(s) 104 may be achieved via software (e.g., software representing hardware). In other embodiments, the capture of highlights on streaming device(s) 104 may be achieved via GPU hardware systems (such as NVIDIA's hardware based SHADOWPLAY system).

The camera control application 144 may be in communication with a data store(s) 116, which may include the buffer 130. The camera control application 144 may further be in communication with the buffer 130, where used. In some embodiments, captured game stream data may be transmitted to data store(s) 116 for storage. The data store(s) 116 may include databases that contain game information, graphical overlay information, game name information for labeling highlights, and system information (e.g., for the client device(s) 102, such as whether certain features or functionality are supported).

The RTSP application 142 may receive the instance of the game 132 directly and/or through the camera control application 144 and/or highlight capture application 164 and encode the instance of the game 132 into a game stream to be communicated over the network(s) 108. In some embodiments the RTSP application 142 may act as a router to communicate between the camera control application 144, highlight capture application 164, the instance of the game 132, and the network(s) 108.

In some example embodiments, the RTSP application 142 may communicate a captured game stream to the client device(s) 102 to display, share, and/or store the captured game stream.

The highlight generation system 140 may further include the client device(s) 102 with a chromium embedded framework (CEF) client 146 (or other browser embedded framework client type). The CEF client 146 may be in two-way communication with the graphical overlay 148, and/or a display 110. The CEF client 146 may further be in communication with a shareserver 166 and a data store(s) 176 that may include a buffer 178. The CEF client 146 may receive the game stream from the RTSP application 142 via the network(s) 108. The CEF client 146 may generate the graphical overlay 128 for highlight capture and/or perform one or more functions for game streaming. The CEF client 146 may communicate input from input device(s) 112 (shown in FIG. 1A) to the streaming device(s) 104. In some embodiments, input from the graphical overlay 128 may be received by the CEF client 146 and instructions may be appropriately submitted to (in some embodiments) the shareserver 166 and/or the streaming device(s) 104. The game stream received by the CEF client 146 may be transmitted to the display 110. The CEF client 146 may decode or act as a decoder for the game stream prior to being transmitted to the display 110.

The CEF client 146 may further be in communication with a highlight capture application 172. The highlight capture application 172, like the highlight capture application 164, may use software and/or hardware systems to capture highlights on the client device(s) 102. In some embodiments the game stream may be captured and stored in the data store(s) 176 and/or the buffer 180. The highlight capture application 172 may receive decoded game stream data from the streaming device(s) 104 and may provide automatic game highlight generation. The highlight capture application 172 may manipulate the game stream to a form that can be stored, edited, and/or otherwise used by the client device(s) 102, as dictated by the request for a highlight. The highlight capture application 172 may generate and associate metadata from the game with the highlight files.

The data store(s) 176 may include the buffer 180 on the client device(s) 102. The data store(s) 176 and the buffer 180 may be similar to the data store(s) 116 and buffer 130. The data store(s) 176 and/or the buffer 180 may be configured to capture the game stream in temporary or permanent storage and may include hard drives, solid state drives, RAM, or other computer storage media.

The shareserver 166 may be a client plugin that parses data between the CEF client 146 and the highlight capture application 172. Data may be parsed and retained for information such as hotkeys and saved settings between multiple instances of the game 132.

In some embodiments, the highlight generation system 140 may include other plugins 170. The other plugins 170 may be additional plugins that may be implemented into the highlight generation system 140. The other plugins 170 may be in communication with the highlight capture application 172, the data store(s) 176, the shareserver 166, and/or the CEF client 146. In some embodiments the other plugins 170 may be third party stream viewing services, local client software for chatting online, and/or post-processing filter software (e.g., NVIDIA's FREESTYLE). The other plugins 170 may enable colorization and filtering of game stream data, may notify others that a player is in-game, or provide system information for the client device(s) 102.

The highlight generation system 140 may include a muxing application 174. The muxing application 174 may include operation system specific components for generating highlight files, such as by standardizing the interface for muxing video data and audio data into the files.

Although the components of the system 140 are illustrated with a specific distribution in FIG. 1B, this is not intended to be limiting. For example, some or all of the components, features, and/or functionality of the system 140 may be considered components, features, and/or functionality of a proxy agent (e.g., the proxy agent 118). As such, the location of the components, features, and/or functionality within the system 140 may be different—e.g., depending on system information of the client device(s) 102 and/or the streaming device(s) 104—in different embodiments, as described herein with respect to the proxy agent. In addition, although the client device(s) 102 and the streaming device(s) 104 are illustrated in FIG. 1B, this is not intended to be limiting. In some embodiments, a secondary device(s) may also be included in the system 140 (e.g., to perform game analysis for automatic highlight generation, such as by using a game analysis application as one of the other plugins 170).

Now referring to FIG. 1C, FIG. 1C is another example system diagram for highlight generation in cloud gaming systems, in accordance with some embodiments of the present disclosure. In a highlight generation system 150 within a game streaming environment, the client device(s) 102 may receive input data in response to inputs to the input device(s) 112, transmit the input data to the streaming device(s) 104 and/or the secondary device(s) 106, receive an encoded game stream from the streaming device(s) 104, and display the encoded game stream on the display 110. Computationally intensive computing and processing required for generation of an instance of a game (e.g., the instance of a game 132 of FIG. 1A or FIG. 1B) may be offloaded to the streaming device(s) 104 (e.g., such that rendering of the game session is executed by GPU(s) of the streaming device(s) 104). In some examples, a gameplay session may be streamed to the client device(s) 102 and/or secondary device(s) 106 from the streaming device(s) 104. Offloading the generation of the gameplay may reduce requirements of the client device(s) 102 and secondary device(s) 106 for graphics processing and rendering. By removing tasks of game generation and rendering from the client device(s) 102, the client device(s) 102 may use its compute resources to capture at least a portion of the in game highlights, store the highlights, generate the graphical overlay (e.g., the graphical overlay 128 of FIG. 1A), and/or perform one or more other tasks for highlight generation (e.g., tasks attributed to the proxy agent 118, herein).

For example, the client device(s) 102 may be displaying a frame of an instance of a game on a display based on receiving a game stream from the streaming device(s) 104. The client device(s) 102 may receive an input from one of the input device(s) 112. Input data may be transmitted to the streaming device(s) 104 and/or the secondary device(s) 106 via network(s) 108, and the streaming device(s) 104 and/or the secondary device(s) 106 may receive the input data. The input data may be received at the communication interfaces 152. CPU(s) 154 may receive the input data, process the input data, and transmit data to the GPU(s) 156 that cause GPU(s) 156 to generate a rendering of the instance of the game (e.g., instance of the game 132 of FIG. 1A). For example, in some embodiments, the input data may be representative of movement of a character of the user in a game, firing a weapon, reloading, passing a ball, turning a vehicle, etc. The rendering component 158 may render the game session (e.g., representative of the result of the input data) and the proxy agent 118 may capture the rendering of the instance of the game as display data in data store(s) 116 and/or buffer 130.

The encoder 160 may then encode the instance of the game to generate an encoded game stream and the encoded game steam may be transmitted to the client device(s) 102 and/or the secondary device(s) 106 over the network(s) 108 via the communication interface 152. The client device(s) 102 may receive the encoded game via a communication interface 182 and the decoder 162 may decode the encoded gameplay to generate the game to be displayed. The client device(s) 102 may then display the game stream via the display 110.

In some embodiments, the highlight generation system 150 may include a secondary device(s) 106. The game stream may be transmitted—e.g., simultaneously, in some examples—to the secondary device(s) 106 and received by a communication interface 184. The communication interface 184 may submit the encoded game stream to a decoder 162, a game analysis application 124, and/or a proxy agent 118. The proxy agent 118 may store at least a portion of the instance of the game in data store(s) 116 and/or buffer 130.

Figure 2:
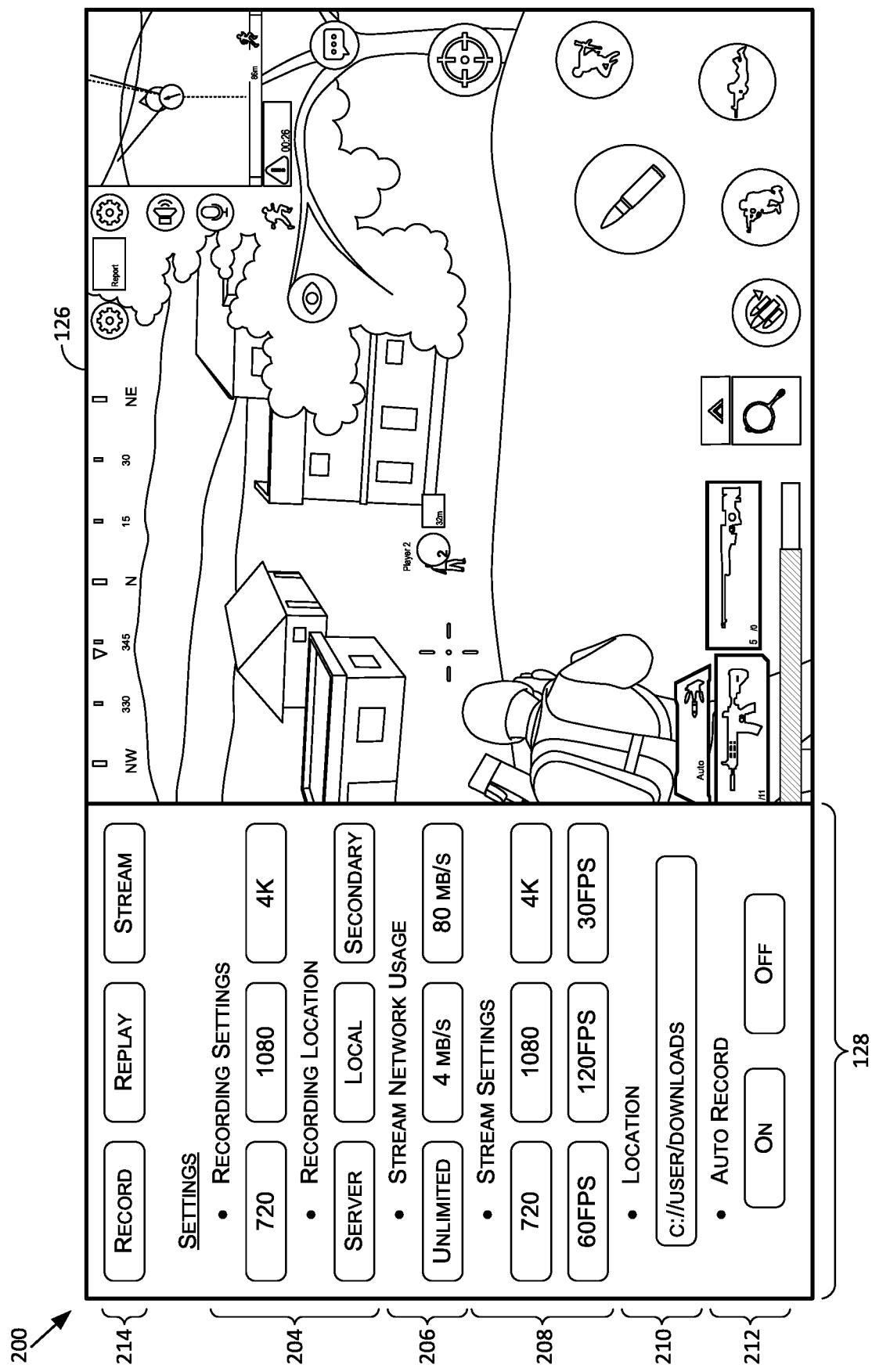
FIG. 2 is an example screenshot from a display of a game session including a graphical overlay for highlight generation, in accordance with some embodiments of the present disclosure.

Now referring to FIG. 2, FIG. 2 is an example screenshot from a graphical overlay for generating and adjusting the game stream and highlight generation, in accordance with some embodiments of the present disclosure. The graphical overlay 128 may include recording settings 204, network usage 206, stream settings 208, location 210, an automatic recording option 212, and/or other settings. The graphical overlay 128 may also include capture controls 214.

The capture controls 214 may, based on a selection, send an indication to capture at least a portion of the game stream based on the recording settings 204. Various types of capturing the game stream may be presented in the capture controls 214. For example, the capture controls 214 may have selections to record gameplay (e.g., a snapshot, a highlight, an entire recording, etc.) by signaling to the proxy agent to capture at least a portion of the game stream. In operation, the gameplay may be recorded from the moment the proxy agent was signaled to capture the game stream. In another example, the capture controls 214 may have selections for capturing a "replay" (e.g., a highlight) by signaling to the proxy agent to retain a buffer (e.g., the buffer of FIG. 1A) of an interval of time in the game session and/or additional recording not in the buffer of an interval of time after the signal is received by the proxy agent. In other words, and as a non-limiting example, a user may select a replay button and the proxy agent may capture an interval of time before the button was selected and/or after the button may be selected.

The capture controls 214 may also have a user-selectable element to stream the game stream. When a user selects the option to stream the game stream, a client device(s) 102 may transmit the instance of the game generated by the streaming application 120 to additional devices or to a third party server to be sent to additional devices (e.g., secondary device(s) 106, the streaming device(s) 104, other client device(s) 102, etc.).

The recording settings 204 may control various aspects of the proxy agent (e.g., as the proxy agent 118 of FIG. 1A). A user may select, from user-selectable elements, the recording settings 204 of one of various options to record gameplay. For example, the recording settings 204 may include 720, 1080, or 4K resolutions. Recording gameplay at each of these resolutions require increasingly more resources (e.g., network resources or compute resources) and/or space in a data store(s) 116 from FIG. 1A) and therefore a user may select one of many different recording settings dependent on if the proxy agent is recording gameplay on a client device, secondary device, or streaming device (e.g., the client device(s) 102, secondary device(s) 106, and streaming device(s) 104 of FIG. 1A).

In some embodiments, the recording settings 204 may include manual controls for selecting which of the client device(s), secondary device(s), and/or streaming device(s) (such as those described in FIG. 1A) activate the proxy agent. In this way, a user may select their preferred location for gameplay to be recorded.

The network usage 206 of the stream may include a variety of user-selectable elements to control the network usage of the game stream. In some aspects and at certain settings, streaming a game to a client device may use a large amount of data over a network. A user may select the usage of the game stream in (as a non-limiting example) MB/S to limit on the client device the usage of the game stream over the network.

The stream settings 208 may include a variety of user-selectable elements to control the quality of the stream. Each of the selectable elements may send an indication to the stream application (e.g., the streaming application 120 of FIG. 1A) to adjust the generation of the instance of the game. A user may select for the instance of the game to be generated at 720p, 1080p, 4K or a custom resolution. Further, a user may select for the instance of the game to be generated at 60 FPS, 120 FPS, or a custom frame rate.

In instances where the proxy agent is set to record gameplay locally on the client device, a user may select the location 210 of the data store on the client device. For example, a user may select a downloads folder in a "C" drive, as shown in FIG. 2.

In some aspects, the graphical overlay 128 may include an automatic recording option 212. The automatic recording option 212 (which may be referred to as "auto highlights"), when activated, may activate a game analysis application (e.g., the game analysis application 124 of FIG. 1A). When activated, the game analysis application may determine a recording event has taken place and signal to the proxy agent to capture at least a portion of the game stream.

Figure 3:
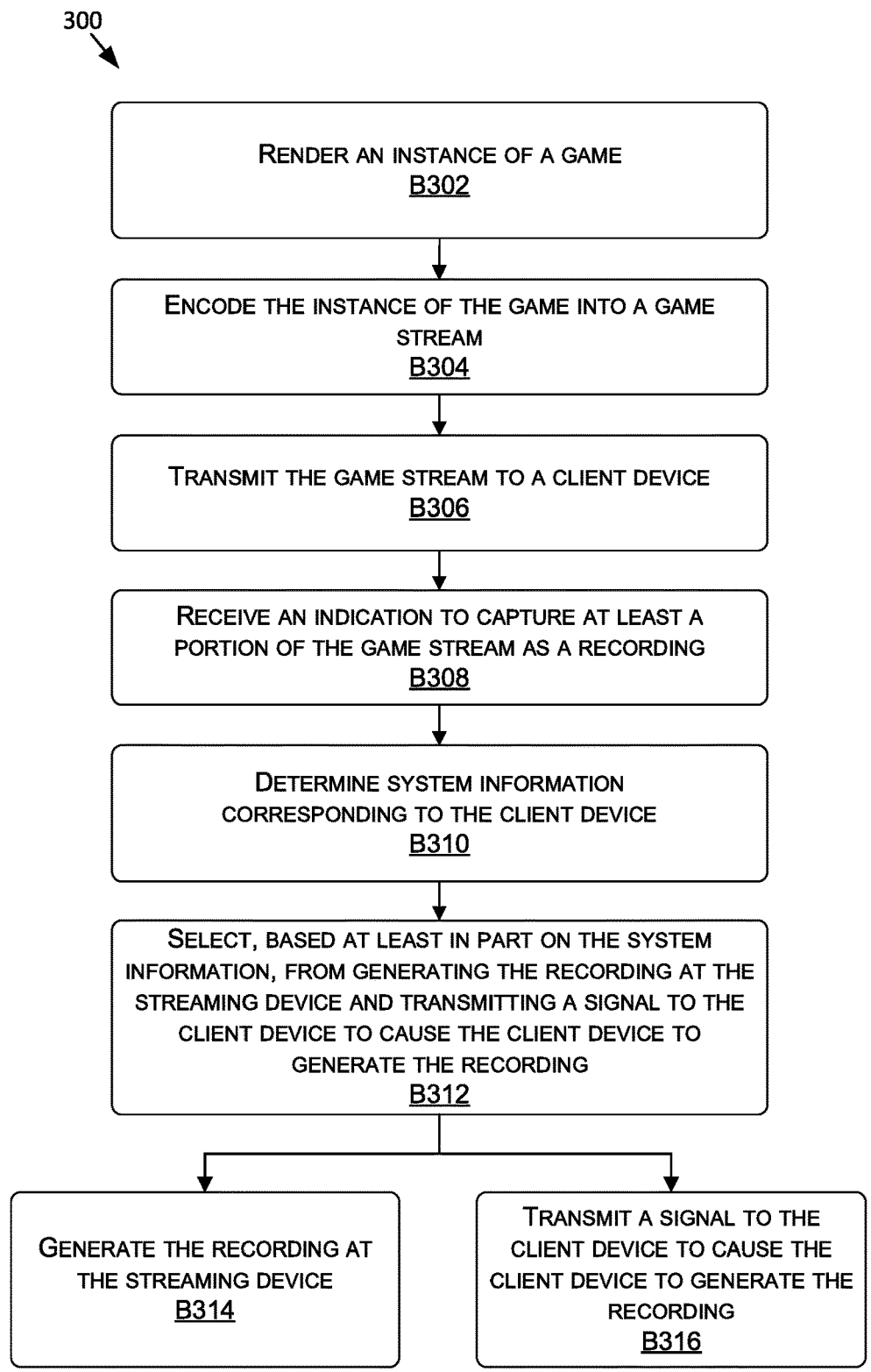
FIGS. 3-4 are flow diagrams showing methods for highlight generation in cloud gaming systems, in accordance with some embodiments of the present disclosure.
Figure 4:
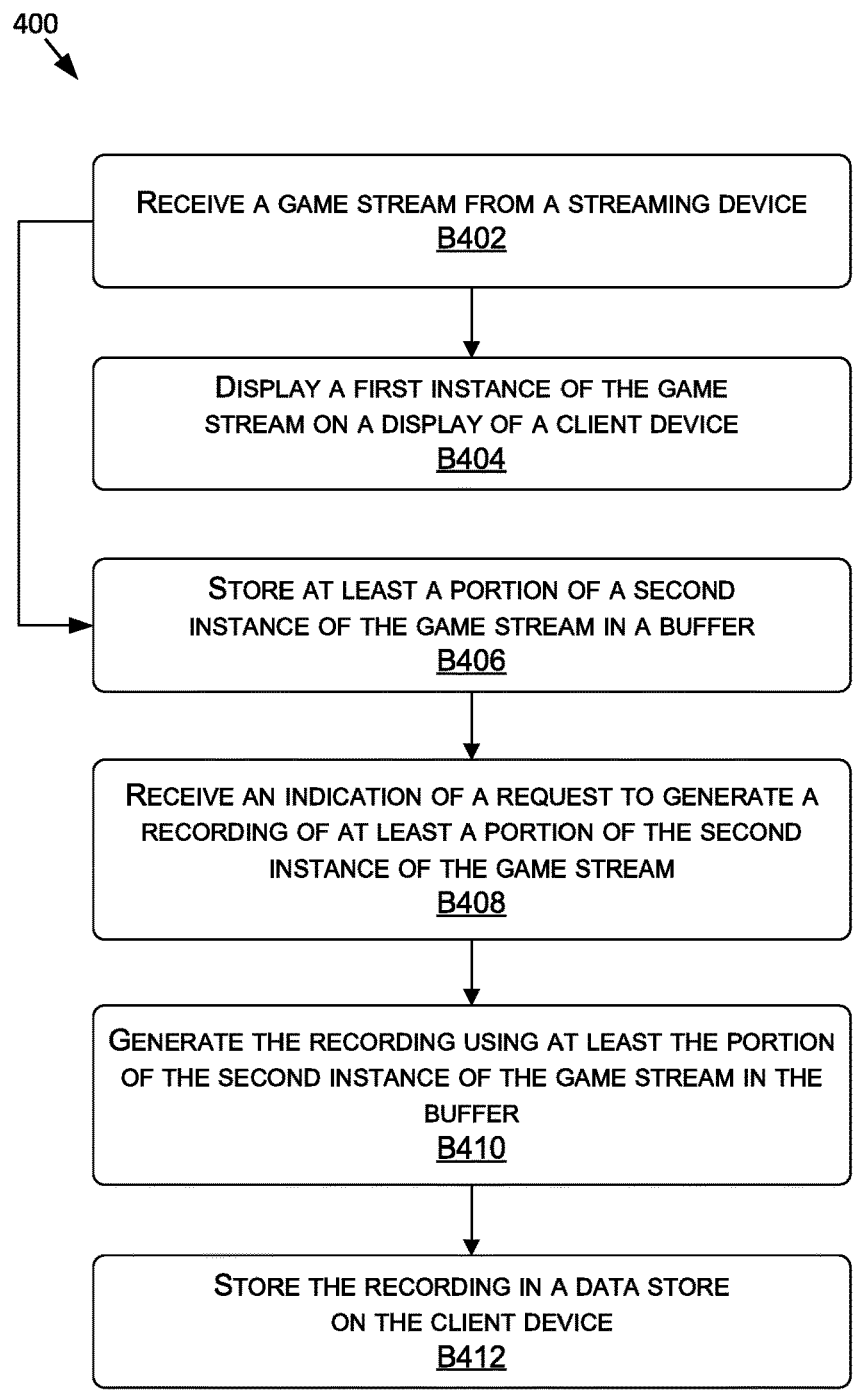

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 300 and 400 are described, by way of example, with respect to the highlight generation system 100 of FIG. 1A. However, these methods may additionally or alternatively be executed by any one system, or any combination of systems, including, but not limited to, those described herein.

FIG. 3 is a flow diagram showing a method 300 for generating a highlight within a game streaming environment. The method 300, at block B302, includes rendering an instance of a game. For example, the instance of game 132 may be rendered by a streaming device(s) 104.

The method 300, at block B304, includes encoding the instance of the game into a game stream. For example, the game stream may be encoded using various techniques. Encoding a game stream may assist in transmitting the instance of the game 132 over the network(s) 108, for highlight generation, and/or for display on the client device(s).

The method 300, at block B306, includes transmitting the game stream to a client device. For example, the game stream may be transmitted over the network(s) 108 to the client device(s) 102.

The method 300, at block B308, includes receiving an indication to capture at least a portion of the game stream as a recording. For example, an indication may be received in response to a user input (e.g., to a hotkey) on the client device(s) 102 to generate a highlight, in response to analysis of the game stream by the game analysis application 124, and/or in response to another action or determination by the system 100.

The method 300, at block B310, includes determining system information corresponding to a client device. For example, the system information for the client device(s) 102, the secondary device(s) 106, and/or the streaming device(s) 104 may be determined. The system information may include, without limitation, the storage capacity, encoding capability, and/or processing capability of the client device(s) 102, the secondary device(s) 102, and/or the streaming device(s) 104. In some embodiments, the system information may be used to determine a rendering and/or streaming bitrate and/or framerate (e.g., a minimum Quality of Service (QoS)) achieved by distributing—dynamically, in some embodiments—the processing tasks of the proxy agent between and among the various devices of the system 100. In these examples, the system information may represent a measure of the capability based on capabilities one or more of the devices. The system information may also, or alternatively, include the recording settings of the game stream and/or the network information of the network(s) 108.

The method 300, at block B312, includes selecting, based at least in part on the system information, from generating the recording at the streaming device and transmitting a signal to the client device to cause the client device to generate the recording. For example, the system information of the client device(s) 102 may be used to determine whether certain features and/or functionalities should be executed on the client device(s) 102, the streaming device(s) 104, and/or the secondary device(s) 106. In some examples, a minimum measure of capability (e.g., in some embodiments, a threshold) of one or more of the devices in the system 100 may be used to select which device is to generate the recording. In another example, configurations that achieve a QoS (measured by, in non-limiting examples, a rendering and/or streaming bitrate and/or framerate) may be used to select which device is to generate the recording, perform analysis of the recording, share the recording, store the recoding, and/or perform one or more other tasks of the proxy agent.

The method 300, at block B314, includes generating the recording at the streaming device(s) 104. For example, where the client device(s) 102 does not satisfy the minimum measure of capability (and/or QoS) or requirements to allow the highlight generation and/or game streaming to operate effectively (e.g., with low-latency and high quality), the recording may be generated at the streaming device(s) 104.

The method 300, at block B316, includes transmitting a signal to the client device to cause the client device to generate the recording. For example, where the client device(s) 102 does satisfy a minimum measure of capability standards or requirements to allow the highlight generation and/or game streaming to operate effectively (e.g., with low-latency and high quality), the recording may be generated at the client device(s) 102, and the streaming device(s) 104 and/or the secondary device(s) 106 may transmit the signal to the client device(s) 102 to cause the client device(s) 102 to generate the recording.

Now referring to FIG. 4, FIG. 4 is another flow diagram showing a method 400 for generating a highlight within a game streaming environment. The method 400, at block B402, includes receiving a game stream from a streaming device. For example, the client device(s) 102 may receive the game stream from the streaming device(s) 104.

The method 400, at block B404, includes displaying a first instance of the game stream on a display of a client device. For example, a first instance of the game stream may be displayed on a display of the client device(s) 102.

The method 400, at block B406, includes storing at least a portion of a second instance of the game stream in a buffer. For example, a second instance of the game stream may be stored in the buffer 130 of the client device(s) 102.

The method 400, at block B408, includes receiving an indication of a request to generate a recording of at least a portion of the second instance of the game stream. For example, an indication may be received in response to a user input (e.g., to a hotkey) on the client device(s) 102 to generate a highlight, in response to analysis of the game stream by the game analysis application 124, and/or in response to another action or determination by the system 100.

The method 400, at block B410, includes generating the recording using at least the portion of the second instance of the game stream in the buffer. For example, at least some of the second instance of the game stream stored in the buffer 130 may be copied to generate a highlight (e.g., a snapshot, a recording, a short clip, etc.).

The method 400, at block B412, includes storing the recording in a data store on the client device. For example, the recording (e.g., the highlight) may be stored in the data store(s) 116 of the client device(s) 102.

Figure 5:
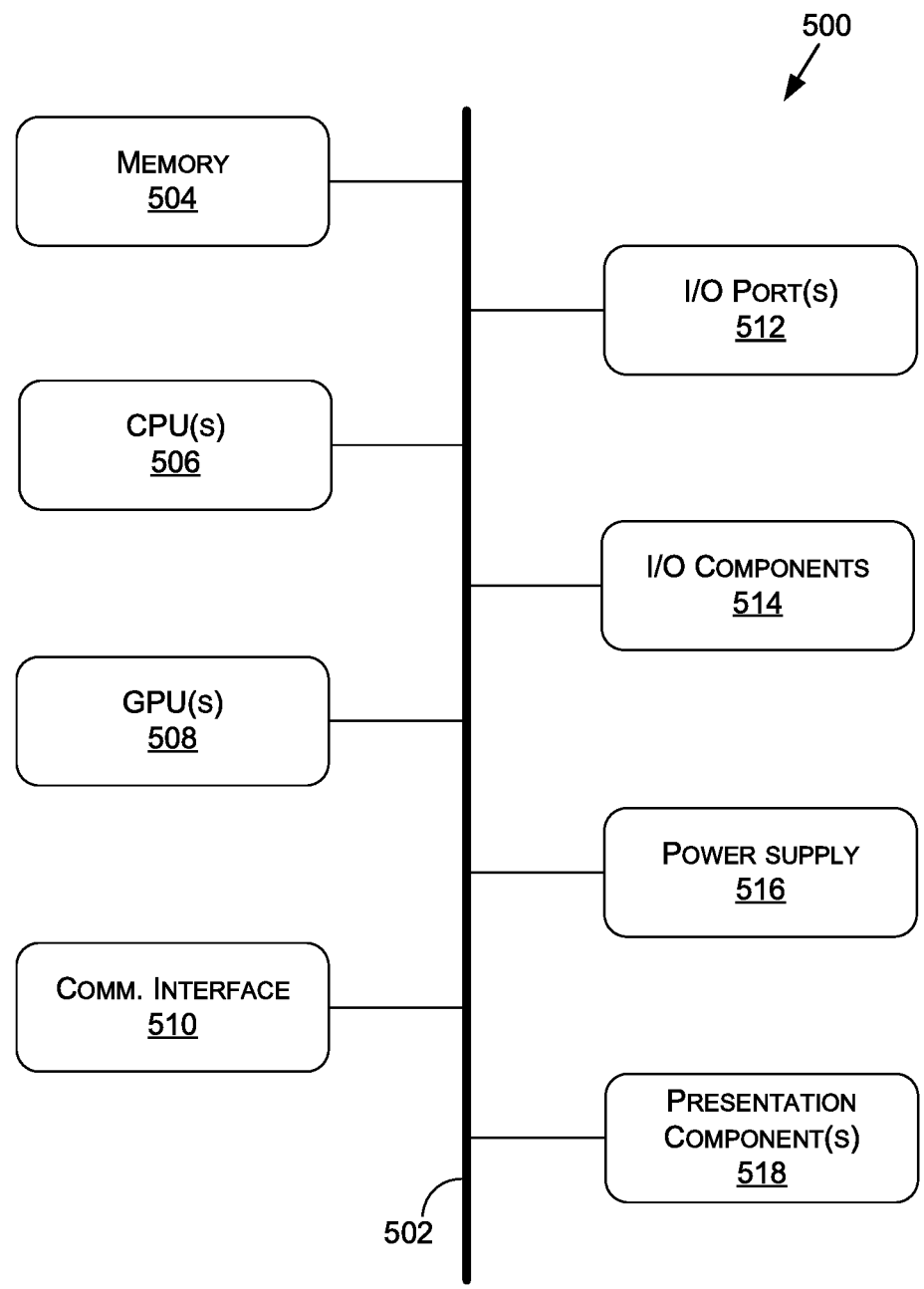
FIG. 5 is a block diagram of an example computing environment suitable for use in implementing some embodiments of the present disclosure.

FIG. 5 is a block diagram of an example computing environment suitable for use in implementing some embodiments of the present disclosure. Computing device 500 may include a bus 502 that directly or indirectly couples the following devices: memory 504, one or more central processing units (CPU) 506, one or more graphics processing units (GPU) 508, a communication interface 510, input/output (I/O) ports 512, input/output components 514, a power supply 516, and one or more presentation components 518 (e.g., display(s)).

Although the various blocks of FIG. 5 are shown as connected via the bus 502 with lines, this is not intended to be limiting and is for clarity only. For example, in some embodiments, a presentation components 518, such as a display device, may be considered an I/O component 514 (e.g., if the display is a touch screen). As another example, the CPU(s) 506 and/or GPU(s) 508 may include memory (e.g., the memory 504 may be representative of a storage device in addition to the memory of the GPU(s) 508, the CPU(s) 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The bus 502 may represent one or more busses, such as an address bus, a data bus, a control bus, or a combination thereof. The bus 502 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program applications, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The communication media may embody computer-readable instructions, data structures, program applications, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 506 may be configured to execute the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an ARM processor implemented using Reduced Instruction Set Computing (RISC) or an x86 processor implemented using Complex Instruction Set Computing (CISC). The computing device 500 may include one or more CPU(s) 506 in addition to one or more microprocessors or supplementary co-processors, such as math co-processors.

The GPU(s) 508 may be used by the computing device 500 to render graphics (e.g., 3D graphics). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data. The display memory may be included as part of the memory 504. The GPU(s) 508 may include two or more GPU(s) operating in parallel (e.g., via a link). When combined together, each GPU 508 may generate pixel data for different portions of an output image or for different output images (e.g., a first GPU for a first image and a second GPU for a second image). Each GPU may include its own memory, or may share memory with other GPUs.

In examples where the computing device 500 does not include the GPU(s) 508, the CPU(s) 506 may be used to render graphics.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. A NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program applications, being executed by a computer or other machine, such as a personal data assistant or other handheld device. Generally, program applications including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    rendering, using a computing device, graphical output corresponding to an instance of a game;
    encoding, using the computing device, the graphical output corresponding to the instance of the game in a game stream;
    transmitting, using the computing device, the game stream to a client device for display at the client device, the client device being remotely located with respect to the computing device;
    receiving an indication to store at least a portion of the game stream as a highlight;
    analyzing, using the computing device and based at least on the indication, system information corresponding to the client device;
    determining, using the computing device and based at least on the analyzing, to cause the client device to store the at least the portion of the game stream as the highlight; and
    transmitting, using the computing device and based at least on the determining, a signal to the client device to cause the client device to store the at least the portion of the game stream as the highlight.

2. The method of claim 1, further comprising:
    determining, based at least on the analyzing, that causing the client device to store the at least the portion of the game stream achieves a threshold level of performance,
    wherein the transmitting the signal is further based at least on the determining that the causing the client device to store the at least the portion of the game stream achieves the threshold level of performance.

3. The method of claim 1, wherein the indication is received from a secondary device based at least on an analysis associated with the game stream performed by the secondary device indicating that a recording event occurred in the instance of the game.

4. The method of claim 1, wherein the indication is received from the client device based at least on an input received from the client device.

5. The method of claim 1, wherein the system information includes at least one of storage capacity, encoding capability, processing capability, recording settings, or network information.

6. The method of claim 1, wherein the game stream is stored in a buffer based at least on the system information, and the signal causes the client device to store the at least the portion of the game stream from the buffer.

7. The method of claim 1, further comprising:
    transmitting the game stream to a secondary device; and
    sending a signal to the secondary device to cause the secondary device to store the at least the portion of the game stream as the highlight.

8. The method of claim 1, further comprising:
    based at least on the system information, generating, using the computing device, a supplemental graphical overlay separate from the rendering of the instance of the game, the supplemental graphical overlay enabling control of one or more recording features of the game stream; and
    encoding the supplemental graphical overlay within the game stream, wherein the game stream includes the supplemental graphical overlay.

9. The method of claim 1, wherein the signal represents a command to store the at least the portion of the game stream as the highlight, the command including an indication of the portion of the game stream.

10. The method of claim 1, further comprising:
    determining second system information corresponding to the computing device,
    wherein the analyzing comprises analyzing, using the computing device, the system information corresponding to the client device with respect to the second system information corresponding to the computing device.

11. The method of claim 1, further comprising:
    transmitting the game stream to a second client device,
    wherein the analyzing comprises analyzing, using the computing device, the system information corresponding to the client device with respect to second system information corresponding to the second client device.

12. A system comprising:
    one or more processing units to:
        generate an instance of a game in a game stream;
        transmit the instance of the game in the game stream to a client device remote from the system;
        determine to generate a recording associated with the game stream;
        analyze, based at least on the determination to generate the recording associated with the game stream, system information corresponding to the client device;
        determine, based at least on the analyzation of the system information, to cause the client device to store a portion of the game stream as the recording; and
        transmit, based at least on the determination to cause the client device to store the at least the portion of the game stream as the recording, a signal to the client device to cause the client device to store the at least the portion of the game stream as the recording.

13. The system of claim 12, wherein the one or more processing units are further to transmit at least a portion of the instance of the game in the game stream to a plurality of viewing devices.

14. The system of claim 12, wherein the determination to generate the recording associated with the game stream comprises receiving an indication to generate the recording.

15. A method comprising:
    initiating a cloud gaming session between a computing device and a client device remote from the computing device, the client device including an input device for providing game play inputs to a game during the cloud gaming session;
    receiving, using the client device, a game stream of the game from the computing device during the cloud gaming session, the game stream being rendered based at least i-on the game play inputs;

causing a first instance of the game stream to be displayed on a display of the client device;

causing at least a portion of a second instance of the game stream to be stored in a buffer;

sending, using the client device and to the computing device, system information corresponding to the client device;

based at least on the system information, receiving, using the client device and from the computing device, a request to generate a recording of the game stream;

based at least on the request, causing, using the client device, the recording to be generated using at least the portion of the second instance of the game stream from the buffer; and storing the recording in a data store on the client device.

16. The method of claim 15, further comprising:

receiving a first input from the input device representative of a request to display a supplemental graphical overlay within the display of the first instance of the game stream, the supplemental graphical overlay associated with a recording generation feature within the cloud gaming session; and based at least on the request, causing the supplemental graphical overlay to be displayed on the display within a client application separate from a game application displaying the first instance of the game stream on the display.

17. The method of claim 15, further comprising:

receiving a first input from the input device representative of a request to display a supplemental graphical overlay within the display of the first instance of the game stream, the supplemental graphical overlay associated with a recording generation feature within the cloud gaming session;

transmitting an indication of a second request to the computing device; and continuing to receive the game stream from the computing device, the game stream including the supplemental graphical overlay for at least a period of time after the transmitting the indication of the second request, the computing device rendering the supplemental graphical overlay separate from rendering the game of the game stream.

18. The method of claim 15, further comprising:

causing a supplemental graphical overlay to be overlaid on the display of the first instance of the game stream, the graphical overlay including one or more selectable interface elements associated with the generating of the recording.

19. The method of claim 18, further comprising:

receiving a selection of one of the one or more selectable interface elements, wherein the receiving the request to generate the recording of the game stream is further based at least in part on the selection.

20. The method of claim 15, further comprising:

determining, using the client device, to record the game stream; and sending, using the client device and to the computing device, an indication to record the game stream, wherein the receiving the request to generate the recording of the game stream is further based at least on the sending of the indication to record the game stream to the computing device.

* * * * *